US011023445B2

(12) United States Patent
Bestfleisch

(10) Patent No.: US 11,023,445 B2
(45) Date of Patent: Jun. 1, 2021

(54) OPTIMISTIC CONCURRENCY FOR COLLABORATIVE APPLICATIONS

(71) Applicant: SAP SE, Walldorf (DE)

(72) Inventor: Ulrich Bestfleisch, Schwetzingen (DE)

(73) Assignee: SAP SE, Walldorf (DE)

( * ) Notice: Subject to any disclaimer, the term of this patent is extended or adjusted under 35 U.S.C. 154(b) by 234 days.

(21) Appl. No.: 16/044,273

(22) Filed: Jul. 24, 2018

(65) Prior Publication Data

US 2020/0034438 A1    Jan. 30, 2020

(51) Int. Cl.
*G06F 16/23* (2019.01)
*G06F 16/34* (2019.01)
*G06F 16/80* (2019.01)

(52) U.S. Cl.
CPC .......... *G06F 16/2308* (2019.01); *G06F 16/23* (2019.01); *G06F 16/34* (2019.01); *G06F 16/80* (2019.01)

(58) Field of Classification Search
CPC ...... G06F 16/1767; G06F 16/23; G06F 16/34; G06F 16/80; G06F 16/2315
See application file for complete search history.

(56) References Cited

U.S. PATENT DOCUMENTS

| | | | | |
|---|---|---|---|---|
| 5,263,155 A | * | 11/1993 | Wang | G06F 9/466 707/695 |
| 7,676,638 B2 | * | 3/2010 | Duffy | G06F 9/467 711/154 |
| 8,479,090 B2 | * | 7/2013 | Lemonik | G06F 40/117 715/234 |
| 9,430,454 B2 | * | 8/2016 | Newman | G06F 40/166 |
| 9,785,693 B2 | * | 10/2017 | Kapadia | G06F 16/93 |
| 9,928,173 B2 | * | 3/2018 | Gschwind | G06F 12/0815 |
| 2006/0031450 A1 | * | 2/2006 | Unrau | H04L 67/2842 709/223 |
| 2007/0219999 A1 | * | 9/2007 | Richey | G06F 16/2343 |

(Continued)

OTHER PUBLICATIONS

Bryan, "JavaScript Object Notation (JSON) Patch," https://tools.ietf.org/html/rfc6902, 18 pages, Apr. 2013 (retrieved Jun. 20, 2018).

(Continued)

*Primary Examiner* — Albert M Phillips, III
(74) *Attorney, Agent, or Firm* — Klarquist Sparkman, LLP

(57) ABSTRACT

Technologies described herein can be used to support modification to data by a client computing device without a concurrency check. An update to a data document can be received from a client computing device. Contents of the update can be analyzed to determine whether a concurrency check is required before applying the update to the data document. In at least some embodiments, at least part of the contents of the data document can be organized in such a way that multiple, independent modifications can be made to the contents of the data document without concurrency checks. A server computer can be configured to identify updates to these contents of the data document, and to apply the updates to the data document without performing concurrency checks. In at least some embodiments, a list of concurrency-safe data document properties can be accessed when determining whether to omit the concurrency check.

18 Claims, 9 Drawing Sheets

(56) References Cited

U.S. PATENT DOCUMENTS

| | | | | |
|---|---|---|---|---|
| 2012/0101980 A1* | 4/2012 | Taleghani | ........... | G06F 16/1774 |
| | | | | 707/608 |
| 2013/0254416 A1* | 9/2013 | Abraham | ................ | H04L 67/12 |
| | | | | 709/230 |
| 2016/0034433 A1* | 2/2016 | Yamat | ................... | G06F 40/194 |
| | | | | 715/229 |
| 2016/0173594 A1* | 6/2016 | Nelson | ................ | H04L 67/1095 |
| | | | | 709/205 |
| 2018/0349405 A1* | 12/2018 | Augustine | ........... | G06F 16/1787 |
| 2020/0034438 A1* | 1/2020 | Bestfleisch | ............. | G06F 16/23 |

OTHER PUBLICATIONS

Wikipedia, "HTTP ETag," https://en.wikipedia.org/wiki/HTTP_ETag, 3 pages, May 13, 2018 (retrieved Jun. 20, 2018).

Mozilla, "If-Match," https://developer.mozilla.org/en-US/docs/Web/HTTP/Headers/If-Match, 4 pages (retrieved Jun. 20, 2018).

Bradley, *PC World*, "Collaborate in Real-Time with Google Docs," https://www.pcworld.com/article/200269/collaborate_in_real_time_with_google_docs.html, 4 pages, Jul. 1, 2010 (retrieved Jun. 20, 2018).

\* cited by examiner

FIG. 5

```
{
    "id": "44f36d6a-4425-4367-a8c9-637c4b0e59a2",
    "revision": "56a1f0ff-074b-4d76-af4b-b189607edf67",
    "items": {
        "6e397244-0464-45fc-b426-3ff96a73dadc": {
            "type": "textbox",
            "title": "The item 1",
            "text": "Longer text",
            "x": 123,
            "y": 113,
            "comments": [{
                            "text: "Great stuff",
                            "commentedBy": "Foo",
                            "commentedAt": "2018-04-06T14:10:17.133Z"
                        },{
                            "text: "Even greater stuff",
                            "commentedBy": "Bar",
                            "commentedAt": "2018-04-06T14:15:15.903Z"
                        }]
        },
        "7e397244-0464-45fc-b426-3ff96a73dadf": {
            "type": "image",
            "title": "My Image",
            "src": "my.jpg",
            "x": 523,
            "y": 322,
            "comments": []
        }
    }
}
```

FIG. 7

```
"id": "44f36d6a-4425-4367-a8c9-637c4b0e59a2",         ~703       710
"revision": "56a1f0ff-074b-4d76-af4b-b189607edf67",   ~705
[{  ~711
     "op": "add", ~713
     "path": "/items/7e397244-0464-45fc-b426-3ff96a73dadf/comments/-",  ~715, 716
     "value": {
          "text": "Another comment."
     ~717 }
}]
```

```
"id": "44f36d6a-4425-4367-a8c9-637c4b0e59a2",         ~703       720
"revision": "56a1f0ff-074b-4d76-af4b-b189607edf67",   ~705
[{  ~721
     "op": "add", ~723
     "path": "/items/8e397244-0464-45fc-b426-3ff96a73dada/",  ~725
     "value": {
     727   "type": "picture",
            "title": "Yet another picture",
            "src": "bar.png"
     }
}]
```

```
"id": "44f36d6a-4425-4367-a8c9-637c4b0e59a2",         ~703       730
"revision": "56a1f0ff-074b-4d76-af4b-b189607edf67",   ~705
[{  ~740
        "op": "edit", ~743
731    "path": "/items/6e397244-0464-45fc-b426-3ff96a73dadc/x",  ~745
        "value": 565 ~747
},{  ~750
        "op": "edit", ~753
        "path": "/items/6e397244-0464-45fc-b426-3ff96a73dadc/y",  ~755
        "value": 128 ~757
}]
```

OPTIMISTIC CONCURRENCY FOR COLLABORATIVE APPLICATIONS

BACKGROUND

Concurrency control mechanisms can be used to keep data that can be modified by multiple actors (such as multiple threads, processes, processors, and/or computing devices) in a consistent state. Some concurrency control mechanisms, referred to as pessimistic concurrency control mechanisms, allow only one actor to access the data at a time. Such pessimistic concurrency mechanisms may provide a relatively high degree of consistency, but may result in the introduction of processing bottlenecks, since only one actor can access the data at any given time. Some other concurrency control mechanisms, referred to as optimistic concurrency control mechanisms, can allow multiple actors to access data simultaneously, and may allow multiple actors to make modifications to the data independently. However, allowing independent modifications by multiple actors can result in change conflicts that may need to be resolved before the modifications can be applied. In at least some cases when a conflict arises, modifications made to the data by one or more actors may be rejected. In such situations, the one or more actors that initially attempted to make the rejected changes may be required to resolve the conflict(s) and re-attempt their modification(s) of the data.

Therefore, there is room for improvement in technologies related to optimistic concurrency.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In one embodiment, a system comprises a server computer, wherein the server computer comprises a processor and a memory, the memory storing executable instructions that, when executed by the processor, cause the server computer to perform operations, wherein the operations comprise: receiving an update to a data document from a client computing device via a computer network, wherein the update comprises a concurrency token and a description of a change to the data document; determining, using the description of the change to the data document, that a concurrency check can be omitted when applying the update to the data document; and applying the update to the data document without performing the concurrency check.

In another embodiment, a method comprises receiving a partial update to a data document from a client computing device via a computer network, wherein the partial update comprises a description of a change to the data document and a concurrency token. The method further comprises determining, based on the description of the change to the data document, whether a concurrency check is required before applying the partial update to the data document; if the concurrency check is not required, applying the partial update to the data document without performing the concurrency check; and otherwise, performing the concurrency check, comprising determining whether the concurrency token is valid, and applying the partial update to the data document only if the concurrency token is valid.

In another embodiment, one or more computer-readable media store instructions that, when executed by one or more processors, cause the one or more processors to perform operations, the operations comprising: transmitting a data document to a client computing device via a computer network, wherein the data document comprises a concurrency token; receiving a partial update to the data document from the client computing device, wherein the partial update comprises a description of a change to a portion of the data document and the concurrency token; determining, using the description of the change to the portion of the data document, whether a concurrency check is required before applying the update to the data document; if the concurrency check is not required, applying the partial update to the data document without performing the concurrency check; and otherwise, performing the concurrency check, wherein performing the concurrency check comprises comparing the concurrency token in the partial update with a current concurrency token associated with the data document, and applying the update to the document if the concurrency token in the partial update matches the current concurrency token associated with the document.

As described herein, a variety of other features and advantages can be incorporated into the technologies as desired.

BRIEF DESCRIPTION OF THE DRAWINGS

FIG. 5 is a diagram depicting an example data document.

FIG. 7 is a depicting example partial data document updates.

DETAILED DESCRIPTION

EXAMPLE 1

Overview

Figure 1:
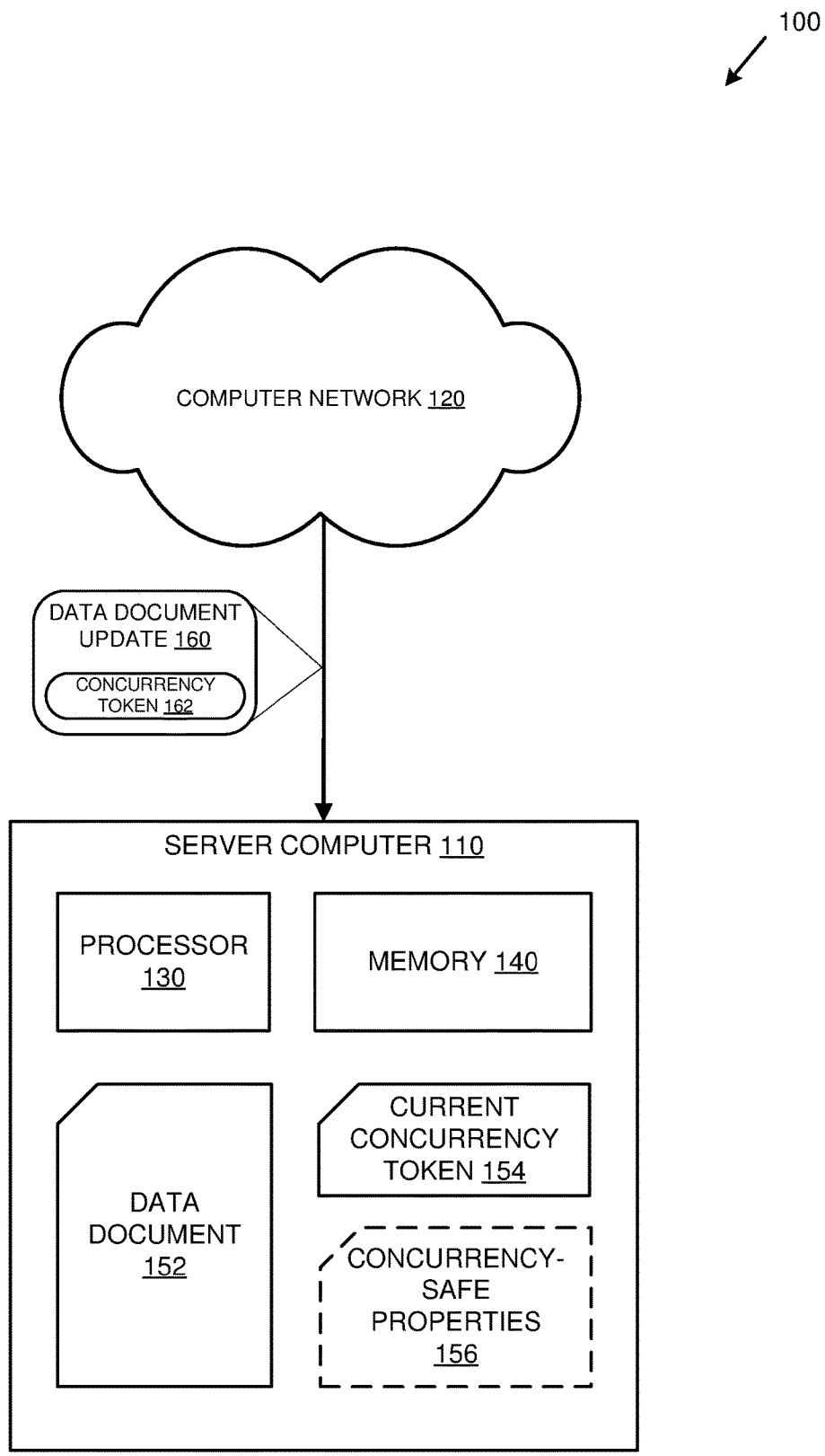
FIG. 1 is a system diagram depicting an example system for supporting updates to a data document without a concurrency check.

The description provided herein is directed to various technologies for managing concurrent access to, and/or modification of, data by multiple actors.

Some systems, such as systems comprising applications that enable multiple users to collaborate in the creation and/or editing of content, may wish to allow users of separate computing devices to make modifications to a given data document independently. However, previous optimistic concurrency control mechanisms may not be sufficient to manage modifications made to the data document in such collaborative scenarios. For example, using previous concurrency control mechanisms, users making modifications simultaneously via separate computing devices may be frequently prompted to resolve conflicts created by changes introduced by other users. While this might, in some cases, keep the data document in a consistent state, it can result in an unpleasant user experience because the users are frequently distracted from their work in order to resolve conflicts. It can also impact user productivity, and result in additional computation and data transmission because, in some cases, a user may have to submit a modification and resolve conflicts multiple times before the modification is ultimately accepted.

Various technologies described herein can be used to address these problems by avoiding conflict checks when applying updates to data documents. For example, when a data document update is received from a client computing device, contents of the update can be analyzed to determine whether a concurrency check is required before applying the update to a data document. In at least some embodiments, at least part of the contents of the data document can be organized in such a way that multiple, independent modifications can be made to the contents of the data document without concurrency checks. A server computer can be configured to identify updates to the at least part of the contents of the data document and to apply such updates without performing concurrency checks. In scenarios where a concurrency check is required, the concurrency check can be performed before applying the update to the data document.

In a different or further example, a server computer can be configured to transmit a data document, and an associated concurrency token, to multiple client computing devices. The multiple client computing devices can be configured to generate updates to the data document and transmit the updates, along with the concurrency token, to the server computer. Upon receiving an update, the server computer can analyze the update to determine whether a concurrency check can be omitted. If the concurrency check can be omitted, the server computer can apply the update to the data document without first performing the concurrency check. If the concurrency check cannot be omitted, the server computer can perform the concurrency check by comparing the concurrency token received in the update with a current concurrency token associated with the data document. If the concurrency tokens match, the update can be applied to the data document. Otherwise, the update can be rejected. If the data document is updated, a new concurrency token can be generated and associated with the data document. The updated data document, and the new concurrency token, can then be transmitted to the client computing devices.

In a different or further example, a data document can comprise a plurality of data items. Multiple client computing devices can be configured to display graphical representations of the plurality of data items. Separate users can use user interfaces of the multiple client computing devices to interact with the graphical representations of the data items. The client computing devices can detect the interactions and generate data document updates based on the interactions. The client computing devices can transmit the updates to a centralized server computer. The server computer, upon receiving an update, can determine whether the update can be applied to the data document without a concurrency check. If the update can be applied without the concurrency check, the server computer can update the data document and transmit the updated data document to the multiple client computing devices. The multiple client computing devices can update the graphical representations of the plurality of data items using the updated data document. The data document can be organized in such a way that certain updates (e.g., adding a new data item, changing a property of a data item, changing graphical position of a data item, adding a comment about a data item, etc.) can be made to the data document without concurrency checks.

EXAMPLE 2

Example Systems and Methods for Processing Data Document Updates Without Concurrency Checks In any of the examples described herein, systems and methods can be provided for processing data document updates without concurrency checks.

FIG. 1 is a system diagram depicting an example system 100 comprising a server computer 110 configured to process a data document update 160 without performing a concurrency check. The server computer 110 comprises a processor 130 and a memory 140. The memory 140 can store instructions that, when executed by the processor 130, configure the server computer 110 to process the data document update 160.

The data document update 160 can be received by the server computer 110 via a computer network 120. The data document update 160 can be received from a client computer device (not shown) connected to the computer network 120. The server computer 110 can be configured to store a data document 152 to which the data document update 160 can be applied. In at least some embodiments, the server computer 110 comprises one or more services configured to receive the data document update 160 via a Hypertext Transport Protocol (HTTP). Additionally or alternatively, the one or more services can receive the data document update 160 via a Representational State Transfer (REST)-based application programming interface.

A current concurrency token 154 can be associated with the data document 152. The server computer 110 can be configured to perform a concurrency check by comparing a concurrency token 162 contained in the update 160 to the current concurrency token 154 associated with the data document 152. If the token values match, the server computer 110 can determine that the update 160 is an update that targets a current version of the data document 152. If the token values do not match, then the server computer 110 can determine that the update 160 is an update to a version of the data document 152 that is not the current version of the data document 152.

The server computer 110 is configured to determine whether the concurrency check can be omitted when applying the update 160 to the data document 152. In at least some embodiments, the data document 152 can comprise one or more data item collections (such as an array, list, map, etc.). Such data item collections can comprise arrangements of multiple data items. A data item collection can be an ordered data item collection (such as a sorted list, etc.) Additionally or alternatively, the data document 152 can comprise an unordered data item collection (such as an array, vector, set, etc.). Although items in some data structures (such as arrays and vectors) can be accessed using indices, an order in which items are added to such data structures does not necessarily impact a consistency of the data structure. Thus, such data structures can serve as unordered data collections.

The server computer 110 can determine whether the update 160 comprises appending a data item to an unordered data item collection of the data document. In at least some scenarios, if the update 160 comprises appending a data item to an unordered data item collection of the data document, the server computer 110 can determine that the concurrency check can be omitted when applying the update 160 to the data document 152.

Additionally or alternatively, the concurrency check can be omitted if the server computer 110 determines that the update 160 targets a concurrency-safe property of the data document 152. In at least some embodiments, the server computer 110 comprises a pre-defined list of concurrency-safe properties 156 that may be included in the data document 152. The server computer 110 can be configured to identify a property of the data document 152 that is targeted by the update 160 and to search the list of concurrency-safe properties 156 for the targeted property. If the server computer 110 locates the identified property in the list 156, the server computer 110 can determine that the concurrency check can be omitted when applying the update 160 to the data document 152.

If the server computer 110 determines that the concurrency check can be omitted, the server computer can apply the update 160 to the data document 152 without checking the concurrency token 162 in a concurrency check. Applying the update 160 to the data document 152 can comprise modifying data contained in the data document 152 based on a description of one or more changes contained in the update 160. Example modifications include additions of data to the data document 152, edits of data contained in the data document 152, and deletions of data contained in the data document 152. In at least some embodiments, the data document 152 can comprise a hierarchical data structure (such as a tree, object graph, nested sets of key-value pairs, etc.). In such an embodiment, the update 160 can comprise a description of one or more changes to be made to the hierarchical data structure. Example hierarchical data structure formats include Javascript Object Notation (JSON), eXtensible Markup Language (XML), and the like. In an embodiment where the data document 152 comprises data stored in a JSON format, the update 160 can comprise data organized in a JSON Patch format. The data organized in the JSON Patch format can describe one or more changes to be made to one or more properties of the data document 152.

In an embodiment wherein the data document 152 comprises an unordered data item collection, and the update 160 comprises a description a data item to be appended to the collection, applying the update 160 to the data document 152 can comprise creating a new data item based on the description and appending the new data item to the unordered data item collection in the data document 152. In a different or further embodiment wherein the update 160 targets a property of the data document, applying the update 160 can comprise making a change to a value of the property described by the update 160.

Applying the update 160 to the data document 152 can comprise changing a value of the current concurrency token 154. In at least one embodiment, the concurrency token 162 and the current concurrency token 154 can comprise numerical values and changing the value of the current concurrency token 154 can comprise incrementing the numerical value of the current concurrency token 154. In a different or further embodiment, the concurrency token 162 and the current concurrency token 154 can comprise identifier values (such as globally unique identifiers (GUIDs) or the like). In such an embodiment, changing the value of the current concurrency token 154 can comprise generating a new identifier value for the current concurrency token 154.

The applying of the update 160 to the data document 152 can comprise creating a new version of the data document 152. The updated value of the current concurrency token 154 can indicate, during the processing of subsequent updates (not shown), that the data document 152 has been changed. In at least some embodiments, the server computer 110 can be configured to transmit a new version of the data document 152, comprising the updated current concurrency token 154, to a client computing device (such as a client computing device from which the update 160 was received) via the computer network 120.

In at least some scenarios, the server computer 110 can be configured to receive a second update (not shown) to the data document 152. The update 160 and the second update can be received from a same client computing device via the computer network 120 or from separate client computing devices. The second update can comprise a concurrency token and a description of another change to the data document 152. The concurrency token can have a same value as the concurrency token 162 or a different value. For example, the second update can target a same version of the data document 152 as the update 160 or a different version of the data document 152.

The server computer 110 can be configured to determine, using the description of the other change in the second update, that a concurrency check is required before applying the second update to the data document 152. The server computer 110 can be configured to perform the concurrency check by checking the concurrency token in the second update. Checking the concurrency token can comprise comparing the concurrency token to the current concurrency token 154 associated with the data document 152. The server computer can be configured to apply the second update to the data document 152 only if the concurrency token in the second update matches the current concurrency token 154 stored on the server computer 110. Thus, the server computer 110 can be configured to determine that the concurrency check can be omitted for some updates to the data document 152 while determining that the concurrency check is required for other updates to the data document 152.

Figure 2:
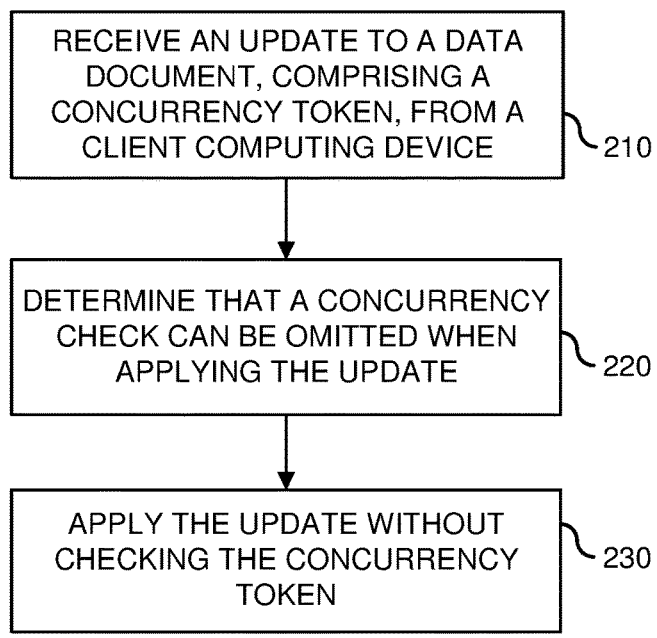
FIG. 2 is a flowchart of an example method for applying an update to a data document without a concurrency check.

FIG. 2 is a flowchart of an example method 200 for applying an update to a data document without a concurrency check. Any of the example systems described herein can be used to perform the example method 200. For example, all or part of the example method 200 can be performed by the server computer 110.

At 210, an update to a data document is received from a client computing device. The update can be received via one or more wired and/or wireless communication channels to which the client computing device is connected. In at least some embodiments, the update is received via a computer network. The update to the data document can comprise a concurrency token and a description of a change to one or more fields of the data document. The concurrency token can be a token that was previously transmitted to the client computing device in association with the data document. For example, the data document and the concurrency token can be transmitted to the client computing device from a server computer. In at least some embodiments, the concurrency token can comprise a version identifier for the data document. When the data document is modified (such as by applying an update to the data document at 230), a current version identifier associated with the data document on the server computer can be changed to a new version identifier.

For example, the version identifier can comprise an integer value and changing the version number can comprise incrementing the integer value. Additionally or alternatively, the version identifier can comprise a globally unique identifier (GUID). GUID's (sometimes referred to as universally unique identifiers (UUID's)) can be generated using algorithms which ensure that generated values are globally (i.e., universally) unique, meaning that (at least in theory) no two generated values will ever be the same, even when they are generated independently by separate computing devices.

The description of the change to one or more fields of the data document can comprise an identifier for an operation to be performed, an identifier for a field within the data document (such as a field name, or the like) to be targeted by the operation, and a value to be applied by the operation. Example operations can include adding a field to the data document, editing a value of a field in the data document, and deleting a field from the data document. In at least some embodiments, the data document can comprise one or more collections of data items. In such an embodiment, example operations can include an addition of a data item to a data collection, a replacement of the data item in a data collection, and/or a removal of the data item from a data collection.

At 220, it is determined that a concurrency check can be omitted when applying the update to the data document. The description of the change to one or more fields of the data document that is included in the update can be used to determine whether a concurrency check is required before making the described change(s) to the data document.

Determining that a concurrency check is not required can comprise determining that the described change can be applied without risking data loss and/or impacting consistency of data in the data document. For example, it can be determined that the concurrency check is not required if the described change comprises an appending of a data item to the data document. Additionally or alternatively, it can be determined that the concurrency check is not required if the change targets a field of the data document that can be updated according to a "last-change-wins" strategy.

For example, the data document can comprise a description of a graphical layout of multiple objects. In at least some embodiments, it can be determined that the concurrency check is not required if the description of the change comprises a changing of one or more graphical position coordinates of one of the multiple objects. This may be the case, for example, when multiple users are viewing separate graphical representations of the multiple objects described in the data document. If multiple users attempt to separately change a position within the graphical layout of one of the objects, it may not be necessary to resolve a change conflict. The change to the graphical position of the object which is applied last can be transmitted to client computing devices of both users. The user, whose change was applied first, will see the position of the object change in accordance with the last-applied change and can conclude that it was moved by the other user. The user can then re-move the object if so desired.

In a different or further embodiment, a manifest of concurrency-safe fields and associated operations can be provided and used to determine whether or not the described change can be applied without a concurrency check. For example, if the described change comprises an appending of a data item to a collection in the data document, and the manifest indicates that appending a data item to the collection is a concurrency-safe operation, then it can be determined that the described change can be applied without a concurrency check. For example, if the described change comprises an edit to be made to the field of the data document, and the manifest indicates that editing the identified field is a concurrency-safe operation, then it can be determined that the described change can be applied without a concurrency check.

At 230, the update is applied to the data document without checking the concurrency token. Applying the update can comprise making the described one or more changes to the one or more fields of the data document. In at least some embodiments, the description of the one or more changes can be used to make a new version of the data document. The new version of the data document can be associated with a new version identifier. In a different or further embodiment, a new concurrency token can be generated and associated with the data document. The new version of the data document, along with the new version identifier and/or the new concurrency token, can be transmitted to the client computing device.

EXAMPLE 3

Example Systems and Methods for Partial Update Processing

In any of the examples described herein, systems and methods can be provided for processing partial data document updates received from a plurality of client computing devices.

Figure 3:
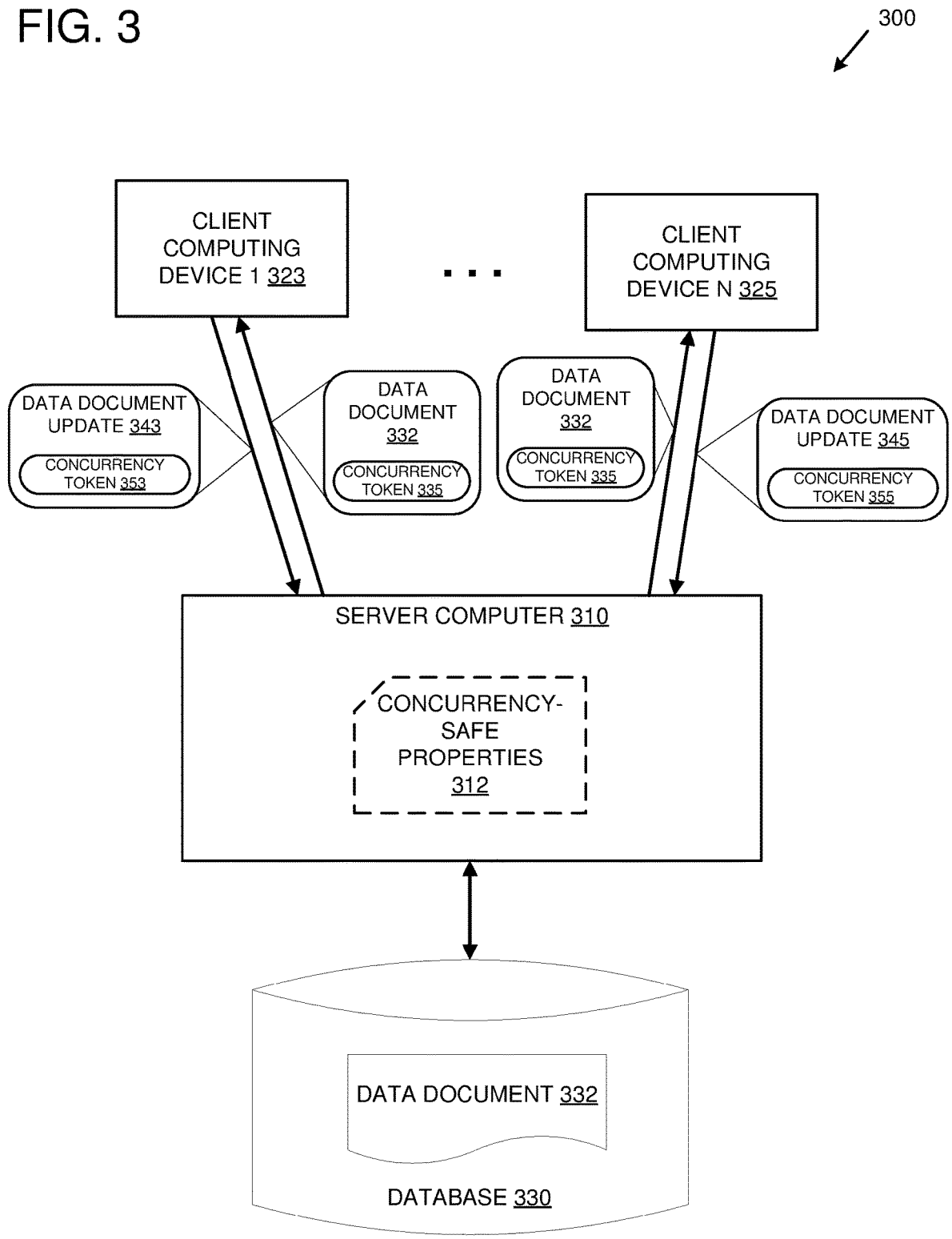
FIG. 3 is a system diagram depicting an example system for processing partial updates for a data document received from a plurality of client computing devices.

FIG. 3 is a system diagram depicting an example system 300 for processing updates (e.g., 343 and 345) to a data document 332 received from a plurality of client computing devices 323-325. The example system 300 comprises a server computer 310, a database 330, and the plurality of client computing devices 323-325.

The server computer 310 can be configured to access a data document 332 stored in the database 330. The server computer can be configured to transmit the data document 332 to the client computer devices 323-325. The data document 332 can be associated with a concurrency token 335. In at least some embodiments, the concurrency token 335 can be stored in the database 330 in association with the data document 332. In one such embodiment, the concurrency token can be stored as part of the data document 332.

The client computing devices 323-325 can be configured to transmit updates 343-345 targeting the data document 332 to the server computer 310. The updates 343-345 can be partial updates that describe changes to a portion of the data document 332. The updates 343-345 can comprise concurrency tokens 353-355, respectively. The client computing devices 323-325 can operate independently of one another and can provide user interfaces through which users can make changes to representations of the data document 332. The changes made by the users can be described in the updates 343-345. Thus, multiple changes can be made by separate users at a same and/or different points in time.

The server computer 310 can be configured to receive the updates 343-345 and determine whether concurrency checks are required when applying one or more of the updates 343-345 to the data document 332. In at least some embodiments, the server computer 310 can receive a partial update to the document and use a description of one or more changes described in the partial update to determine whether a concurrency check is required before applying the partial update to the data document. If the concurrency check is not required, the server computer 310 can apply the partial update to the data document 332 without checking performing the concurrency check. If the concurrency check is required, the server computer 310 can perform the concurrency check to determine whether or not the update can be applied to the data document 332.

For example, based on an analysis of a received partial update, the server computer 310 can select between performing a concurrency check and not performing a concurrency check. The server computer 310 can comprise two update processing modules: a first module that includes a concurrency check before applying an update, and a second module that applies an update without performing a concurrency check. If the server computer 310 determines that a concurrency check is not required, the server computer 310 can select the second module and use the second module to process the update. Otherwise, the server computer 310 can select the first module and use the first module to process the update.

Performing the concurrency check can comprise comparing a concurrency token in the partial update with a current concurrency token (e.g., 335) associated with the data document 332. The server computer 310 can be configured to apply the partial update to the data document 332 if the concurrency token in the partial update matches the current concurrency token associated with the data document. If the tokens do not match, the server computer 310 can reject the partial update.

Thus, if a concurrency check is required for a given update, it is possible that the update will be rejected if the concurrency check is not successful. In some scenarios, if the update is rejected, the client computing device (e.g., 323, 325, etc.) that transmitted the update may be required to resolve one or more conflicts between a version of the data document 332 stored at the client computing device and a current version of the data document and then resubmit the update to the server 310. Since other client computing devices may continue to transmit other updates to the server computer 310 in the meantime, it is possible that the rejected update may have to be transmitted to the server computer 310 multiple times before the concurrency check passes, and the update is applied to the data document 332. However, if the server computer 310 determines that a concurrency check is not required before applying the update, then the server computer 310 can apply the update regardless of whether the concurrency token in the update matches the current concurrency token associated with the data document 332. Thus, if the concurrency check is not required, there may be no risk that the update will be rejected.

In at least some embodiments, a version of the data document 332 can be tracked separately from a concurrency token associated with the data document 332. For example, the data document 332 can be associated with a version number and a concurrency token. In at least one such embodiment, the version number is changed each time an update is applied to the data document 332, while the current concurrency token associated with the data document 332 is changed only when an update to the data document 332 is applied after performing a concurrency check. Thus, a version of the data document 332 can be changed each time the data document 332 is updated, including scenarios where no concurrency check is required, while the concurrency token is only changed when the update required a concurrency check.

In a particular example, the server computer 310 transmits the data document 332 to the client computing devices 323 and 325. The server computer 310 then receives the update 343 from the client computing device 323. The server computer 310 uses a description of a change to the data document 332 contained in the data document update 343 to determine that a concurrency check is not required before applying the update 343 to the data document 332. The server computer 310 then applies the update 343 to the data document 332. Applying the update 343 to the data document 332 can comprise reading a current version of the data document 332 from the database 330, creating a new version of the data document 332 using the description of the change contained in the update 343 and the current version of the data document 332, and saving the new version of the data document 332 to the database 330.

Subsequent to receiving the update 343 from the client computing device 323, the server computer 310 receives the update 345 from the client computing device 325. Using a description of a change to the data document 332 contained in the update 345, the server computer 310 determines that the concurrency check is required before applying the update 345 to the data document 332. The server computer 310 then performs the concurrency check comprising comparing the concurrency token 355 to a current concurrency token associated with the data document 332. Based on the comparison, server computer 310 determines that the update 345 targets a version of the data document 332 that is different from the current version of the data document 332 and rejects the update 345.

In at least some embodiments, determining whether a concurrency check is required can comprise determining that a description of a change contained in a received update (e.g., 343 or 345) comprises appending data to an unordered collection in the data document 332. For example, the data document 332 can comprise a collection of data items wherein an order in which data items are added to the collection does not affect subsequent processing of data items in the collection. The server computer 310 can be configured to determine that a description of a change contained in a received update comprises an appending of one or more data items to the collection. Based on this, the server computer 310 can conclude that the update can be applied to the data document 332 (including the appending of the one or more data items to the collection) without first performing a concurrency check.

In a different or further embodiment, the server computer 310 can comprise a predefined list of concurrency-safe properties 312. In such an embodiment, the server computer 310 can be configured to analyze the description of the change contained in the received update in order to identify one or more properties of the data document 332 that is/are targeted by the update. The server computer 310 can analyze the predefined list of concurrency-safe properties 312 to see if the one or more properties of the data document 332 that is/are targeted by the received update are contained in the list 312. If the one or more identified properties are contained in the list 312, than the server computer 310 can conclude that the received update can be applied to the data document 332 without first performing the concurrency check. However, if one or more of the identified properties is not contained in the list 312, the server computer 310 can determine that the concurrency check is required before applying the received update to the data document 332.

In at least some embodiments, applying a received update to the data document 332 can comprise acquiring a database lock for the data document 332, making changes to the data document 332 that are described in the received update, and then releasing the lock for the data document 332. Making the changes to the data document 332 can comprise performing one or more data access operations to read at least part of the data document 332 from the database 330 and to store at least a modified part of the data document 332 in the database 330.

The client computing devices 323-325 can be configured to receive the data document 332 from the server computer 310. The client computing devices 323-325 can comprise graphical user interfaces (not shown) and can be configured to present graphical representations of the data document 332 to separate users of the client computing devices 323-325 via their respective graphical user interfaces. In at least some embodiments, one or more of the client computing devices 323-325 can be configured to detect changes to one or more of the graphical representations of the data document 332 made by one or more users via one or more of the graphical user interfaces. Responsive to detecting such a change to a graphical representation of the data document, the one or more of the client computing devices 323-325 can generate one or more updates to the data document 332 based on the detected change.

For example, the client computing device 323 can present a graphical representation of the data document 332 to a user of the client computing device 323 via a graphical user interface of the client computing device 323. The client computing device 323 can detect one or more changes made to the graphical representation of the data document 332 by the user through the graphical user interface of the client computing device 323. Based on the one or more detected changes made to the graphical representation, the client computing device 323 can generate the update 343, and can then transmit the update 343 to the server computer 310.

In at least some embodiments, the data document 332 comprises a collection of multiple data items. In such an embodiment, at least one of the client computing devices 323-325 can be configured to present an interactive view of the data document 332 to a user via the graphical user interface of the client computing device. The interactive view of the data document 332 can comprise graphical representations of the multiple data items. The client computing device can detect a change to one or more of the graphical data item representations made via the client computing device's graphical user interface. The client computing device can then generate an update to the data document 332 that comprises a description of the detected one or more changes made to the one or more data items and can transmit the generated update to the server computer 110.

After applying a received update to the data document 332, the server computer 310 can transmit a new version of the data document 332, comprising the applied update, to the client computing devices 323-325. The client computing devices 323-325 can receive the new version of the data document 332 from the server computer 310 and can present a graphical representation of the new version of the data document to respective users of the client computing devices 323-325 via the respective graphical user interfaces of the client computing devices 323-325.

In at least some scenarios, users of separate client computing devices, of the client computing devices 323-325, can view and/or edit separate graphical representations of the data document 332. After an update made by one of the client computing devices is applied to the data document 332 by the server computer 310, a new version of the data document 332 can be transmitted to the client computing devices. After receiving the new version of the data document, the client computing devices can update the separate graphical representations based on the new version of the data document 332. Thus, in at least some cases, changes made by one user via one of the client computing devices can be viewed by one or more other users via one or more other client computing devices.

Figure 4:
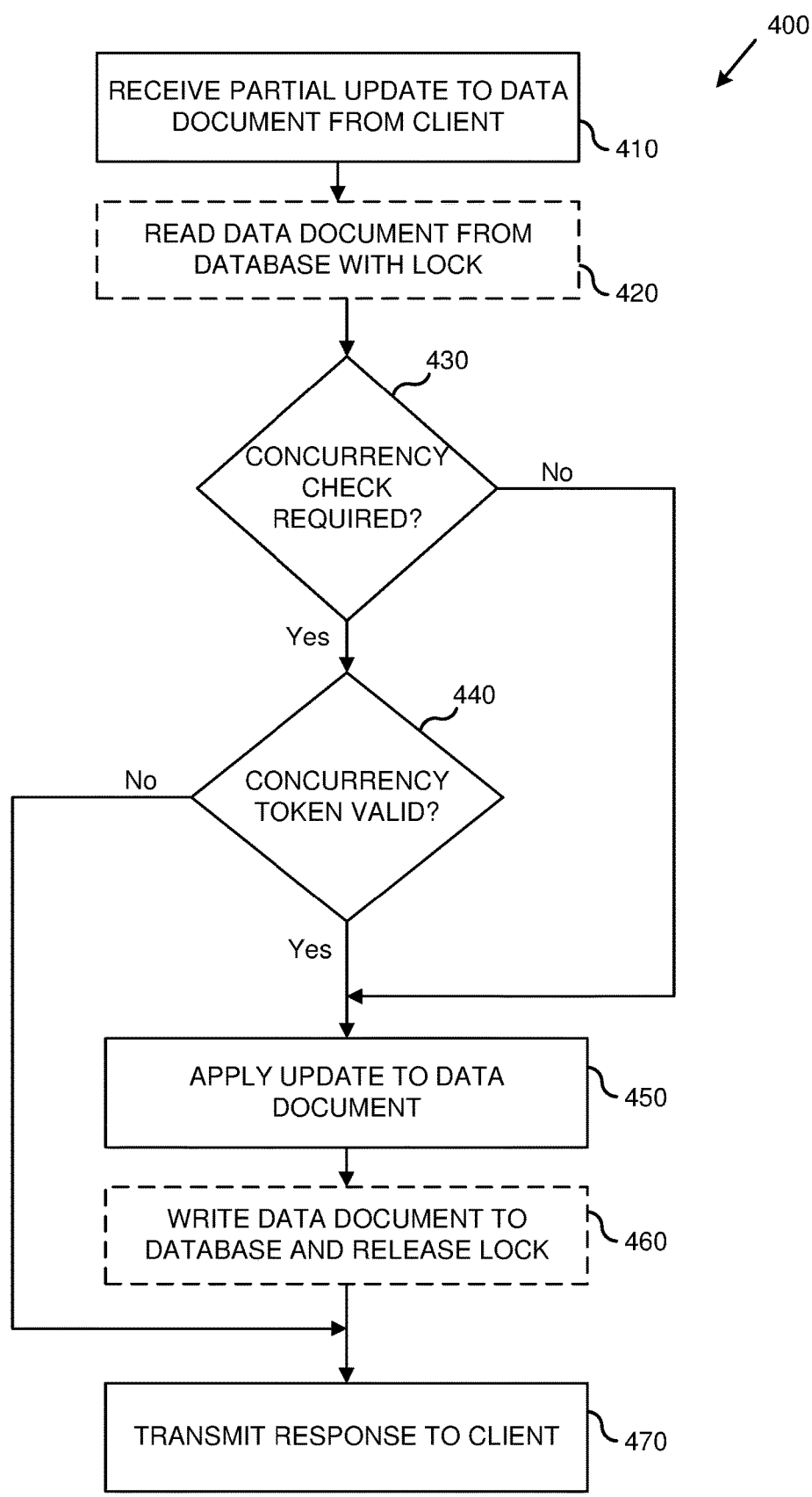
FIG. 4 is a flowchart of an example method for applying a partial update to a data document.

FIG. 4 is a flowchart of an example method 400 for applying a partial update to a data document. Any of the example systems described herein can be used to perform the example method 400. For example, all or part of the example method 400 can be performed by the server computer 310.

At 410, a partial update to a data document is received from a client computing device. The partial update can be received via a computer network to which the client computing device is connected. Additionally or alternatively, the partial update can be received via one or more wired and/or wireless communication channels.

The partial update can comprise a description of one or more changes to the data document and a concurrency token. The concurrency token can be associated with a version of the data document to which the client computing device wishes to make the described changes. In at least some embodiments, the partial update comprises a document identifier associated with the data document. In such an embodiment, where multiple data documents can be accessed, the document identifier can be used to identify the particular data document that is targeted by the partial update.

At 420, the data document is optionally read from a database. In at least some scenarios, a database lock on the data document can be obtained. In an embodiment where the partial update comprises a document identifier, the document identifier can be used to retrieve the data document from the database. For example, multiple data documents can be stored in the database in association with unique identifiers. An index of the associated unique identifiers can be used to locate a data document associated with a given document identifier. In at least some embodiments, multiple versions of a given data document can be stored in the database. Additionally or alternatively, the data document can be stored in the database in association with a current version identifier. In such embodiments, a current (e.g., most recent) version of the data document can be retrieved from the database.

At 430, it is determined whether a concurrency check is required before applying the partial update to the data document. Determining whether the concurrency check is required can comprise determining that the update targets a portion (or portions) of the data document that can be modified independently by separate computing devices without affecting the consistency of data in the data document. For example, determining that a concurrency check is not required can comprise determining that the update is an addition of a data item to a data item collection within the data document for which an order of insertion of data items does not impact the consistency of the data item collection. For example, determining that the concurrency check is not required can comprise determining that the update is an addition or modification of a property of the data document that can be added to/modified without a significant risk of data loss.

In at least some embodiments, a data structure (such as a list, map, manifest, etc.) can be provided that defines combinations of data document properties and associated operations that are concurrency-safe. The partial update can describe an operation (such as addition modification, deletion, etc.) and a property of the data document that is targeted by the operation. If the data structure includes an entry comprising the described operation in association with the identified property of the data document, then it can be determined that the partial update can be applied to the data document without first performing a concurrency check.

If it is determined that a concurrency check is required, at 440 it is determined whether the concurrency token received in the partial update is valid. Determining whether the concurrency token received in the partial update is valid can comprise comparing the concurrency token received in the partial update with a current concurrency token associated with the data document. If the received concurrency token matches the current concurrency token associated with the data document, it can be determined that the concurrency token is valid. However, if the received concurrency token does not match the current concurrency token then it can be determined that the concurrency token is not valid.

In at least some embodiments where the data document is associated with a version identifier, the version identifier of the current (e.g., most recent) version of the data document can be used as the current concurrency token associated with the data document. A valid concurrency token can indicate that the update was generated by the client computing device with reference to the current version of the data document. In contrast, an invalid concurrency token can indicate that the update was generated by the client computing device with reference to another version of the data document (such as a previous version of the data document).

If it is determined at 430 that a concurrency check is not required, or if it is determined at 440 that the concurrency token is valid, then at 450 the partial update is applied to the data document. Applying the partial update to the data document can comprise using the description of the one or more changes to the data document included in the partial update to modify a current version of the data document. In at least some embodiments, a new version of the data document can be created using the description of the one or more changes and a new version identifier can be generated and associated with the new version of the data document. Additionally or alternatively, a new concurrency token can be generated and associated with the data document after the update is applied.

In at least some embodiments, the description of the one or more changes to the data document can comprise a description of one or more operations and one or more fields of the data document targeted by the one or more operations. Example operations include adding a field to the data document, editing a field in the data document, deleting a field from the data document, adding one or more data items to one or more data item collections within the data document, editing one or more data items within one or more data item collections of the data document, removing one or more data items from one or more data item collections in the data document, etc. In at least some such embodiments, the description of the one or more changes can be organized using a JSON Patch data format.

At 460, optionally the data document, with the partial update applied, is written to the database. If a lock was obtained on the data document at 420, then the lock can be released after applying the update to the data document. The database document can be stored in association with a key that comprises a document identifier and a document version identifier (such as a version number, version GUID, etc.). The new version of the data document can be identified as a current (e.g., most recent) version of the data document that has been saved to the database. For example, the document identifier and the version identifier for the new version of the data document can be stored as a key for the current version of the data document. Additionally or alternatively, in an embodiment where the version identifiers comprise an increasing numerical values, the multiple versions of the data document can be stored in association with an index that is sorted by key. In such an embodiment, a first (or last) key in the index can reference the current version of the data document.

At 470, a response is transmitted to the client computing device. If it was determined at 440 that the concurrency token is not valid, then the response can comprise a message indicating that the partial update is rejected. In at least some embodiments, the response can comprise a current version of the data document. In at least some scenarios where the partial update is not applied to the data document, the current version of the data document can be transmitted to the client computing device to allow the client computing device to resolve any conflicts between the current version of the data document and the changes described in the partial update. In a scenario where the partial update is applied to the data document at 450, the response can comprise the new version of the data document, with the changes applied.

In at least some embodiments, a new concurrency token can be generated and associated with the new version of the data document. In at least one such embodiment, a version identifier for the new version of the data document can be used as the concurrency token for the new version of the data document. Alternatively, a concurrency token that is separate from the version identifier for the data document can be generated. This can be done in scenarios where it may be advantageous to track a concurrency token separate from a version identifier for the data document. For example, a new version of the data document, and an associated version identifier, can be generated each time an update is applied to the data document at 450. However, a new concurrency token for the data document may only be generated if it was also determined at 430 concurrency check was required before applying the update. In such scenarios, updates that do not require concurrency checks can be applied to the data document without changing the concurrency token. This may avoid triggering a conflict with a subsequently receive update that does require a conflict check. The new concurrency token can be transmitted to the client computing device in association with the new version of the data document.

EXAMPLE 4

Example Data Document

In any of the examples described herein, data documents can be provided for representing associated data.

FIG. 5 is a diagram depicting an example data document 500. The example data document 500 comprises data in a Javascript Object Notation (JSON) format. The use of a JSON format is not intended to be limiting. Other formats (such as XML, Binary JSON (BSON), PROTOCOL BUFFERS, etc.) are also possible.

The example data document 500 comprises a document identifier 510, a revision identifier 520, and a collection of data items 530. The document identifier 510 can be used to uniquely identify the example data document 500. For example, the example data document 500 can be stored in a document data store (such as a database or the like) and can be accessed in the data store using the document identifier 510. The revision identifier 520 can be used to identify a particular version of a data document that is represented by the data in the example data document 500. For example, when an update is applied to the data document, the value of the revision identifier 520 can be changed. A combination of the document identifier 510 and the revision identifier 520 can be used to identify a particular version of the given document. In at least some embodiments, the revision identifier 520 can be used as a concurrency token. For example, if a client computing device wishes to make an update to the data document 500, the client computing device can transmit the update, including the revision identifier 520, to a server computer from which the data document 500 was received. The server computer can compare the revision identifier 520 in the received update with the revision identifier stored in a current version of the data document by the server computer. If the revision identifiers do not match, the server computer can conclude that the version of the data document 500 held by the client computing device is not the current version of the data document 500.

Alternatively, a separate concurrency token can be associated with the example document 500. In such an embodiment, the revision identifier 520 can be changed whenever an update is applied to the data document 500, but the concurrency token may be changed only if concurrency check was required before applying the update.

The data items collection 530 comprises descriptions of data items 532 and 534. Although two data items are depicted in the data items collection 530 in FIG. 5, fewer or more data items are possible. The data items 532 and 534 can comprise a plurality of properties. For example, the data item 532 comprises properties 552-558. A type property can identify a type of graphical representation for the data item. For example, the type property 552 can indicate that a textbox graphical user interface (GUI) object should be used to represent the data item 532 in a GUI of a client computing device. For example, the type property 559 can indicate that an image GUI object should be used to represent the data item 534 in a GUI of the client computing device.

A title property (e.g., 553) of a data item can have a value that comprises a human-readable name associated with the data item. Graphical coordinate properties of a data item (e.g., 556 and 558) can identify a position at which a graphical representation of the data item should be placed in a GUI of a client computing device. For example, the property 556 can identify an x-axis coordinate position for the data item 532 and the property 558 can identify a y-axis coordinate position for the data item 532. Although two-dimensional coordinates are depicted in FIG. 5, three-dimensional coordinates can also be supported in scenarios where graphical representations of the data items are rendered in a three-dimensional coordinate space.

In at least some embodiments, it is also possible for data items to have different properties based on their different type property values. For example, since the type property 552 indicates that the data item 532 can be represented by a textbox GUI object, the data item 532 can have a text property 554. The value of the text property 554 can be rendered within a text area of the textbox GUI object that represents the data item 532. For example, since the type property 559 indicates that the data item 534 can be represented by an image GUI object, the data item 534 can have an image source property 557. The value of the image source property 557 can comprise a path to an image file. The image in the image file can be rendered within the image GUI object that represents the data item 534. In at least some embodiments, the path to the image file can comprise a uniform resource locator (URL). In such an embodiment, the client computing device can be configured to use the URL and one or more hypertext transfer protocol (HTTP) requests to retrieve the image from a remote server.

A data item can comprise a comments property that has a collection of comment data items as a value. For example, the data item 532 comprises a comments property 540 that has a value comprising an array of comment data items (542-544). A comment data item can represent a comment made by a user regarding the associated data item. For example, the comment data item 542 has a text property 562 that has a value of a comment made by the user regarding the data item 532. The property 564 identifies a user by whom the comment 542 was made. The property 566 has a value of a date and time at which the comment 542 was made.

The data item properties in the example document 500 intended to be illustrative and are not limiting. Other data item properties are also possible.

EXAMPLE 5

Example Graphical User Interface

In any of the examples described herein, systems can be provided for viewing and editing a data document via a graphical user interface.

Figure 6:
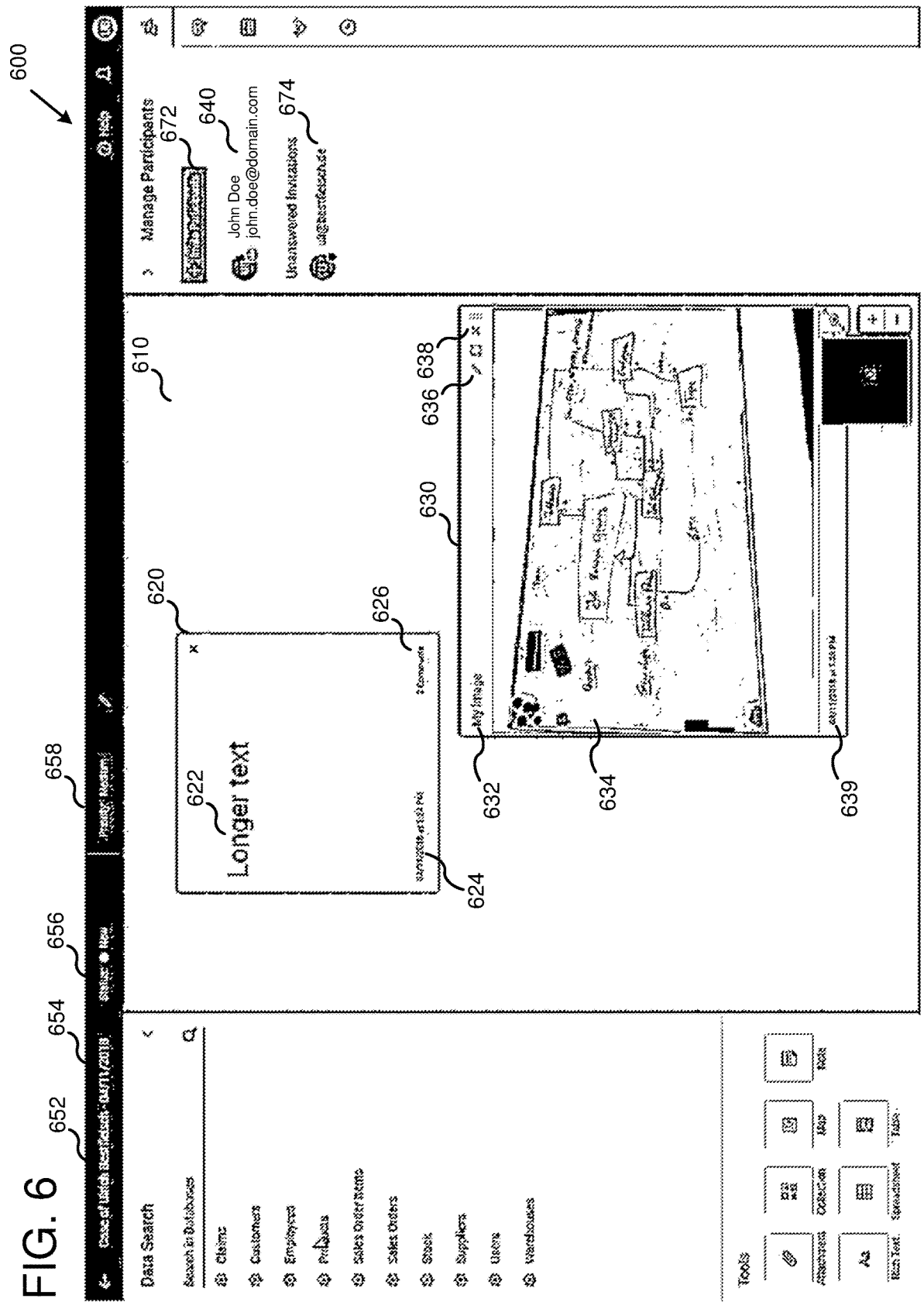
FIG. 6 is a diagram depicting an example graphical user interface comprising a graphical representation of a data document.

FIG. 6 is a diagram depicting an example graphical user interface (GUI) 600 comprising a graphical representation 610 of the example data document 500 depicted in FIG. 5. In at least some embodiments, the GUI 600 can be presented in a web browser of a client computing device. In such an embodiment, a data document (such as the example data document 500) can be transmitted to the web browser of the client computing device via HTTP as a part of one or more hypertext markup language (HTML) payloads. Other embodiments are also possible. For example, the GUI 600 can be presented as part of a stand-alone application running on the client computing device. Additionally or alternatively, the client computing device can maintain a persistent connection to a server computer that enables bi-directional communication between the client computing device and the server computer.

A label 652 can depict a name associated with the data document 500. A label 654 can depict a date on which the data document 500 was last accessed. A label 656 can depict a current status of the data document with respect to the GUI 600. For example, the label 656 can indicate that the graphical representation 610 depicts a current version of the data document 500. If one or more changes are made to the graphical representation 610, the label 656 can indicate that an update for the data document 500 has been generated and transmitted to a server computer. Upon receipt of a response from the server computer, the label 656 can indicate whether or not the update was applied to the data document 500 on the server computer. A label 658 can identify a priority associated with the data document 500. Such a priority can indicate a level of urgency associated with the data document 500. For example, the priority can be a priority of a case or matter with which the data document 500 is associated. Such a priority can indicate a level of urgency for the case, and the associated data document 500, to users of one or more computing devices. In FIG. 6, the label 656 indicates the current priority is medium. Other priorities (e.g., low, lowest, high, highest, etc.) are also possible.

The graphical representation 610 of the data document 500 comprises a graphical representation 620 of the data item 532. The graphical representation 620 comprises a textbox GUI object comprising a text area 622, wherein the value of the text property 554 is rendered. In at least some embodiments, a user can interact with the text area 622 (such as through the use of a mouse, a keyboard, etc.) to edit the value of the text property 554 of the data item 532. The graphical representation 620 is positioned within the GUI 600 based on the graphical coordinate properties 556 and 558 of the data item 532. For example, the graphical representation 610 can comprise a canvas GUI object (or the like) wherein GUI objects can be positioned based on graphical coordinates.

The graphical representation 620 comprises a label 626, indicating that two comments are associated with the data item 532. In at least some embodiments, the label 626 can be selected (such as by clicking the label 626 with a mouse, etc.). Upon detection of a selection of the label 626, the client computing device can be configured to display a GUI object (not shown) in which one or more of the comments 542-544 associated with the data item 532 can be displayed. Additionally or alternatively, the GUI object can comprise one or more user interface elements (such as a textbox, a button, etc.) with which the user can interact to create additional comments associated with the data item 532. The graphical representation 620 comprises a label 624 that indicates a last date and time at which the data item 532 was updated.

The graphical representation 610 of the data document 500 comprises a graphical representation 630 of the data item 534. The graphical representation 630 comprises an image GUI object comprising an image 634 identified by the property 557 of the data item 534. The graphical representation 630 comprises a label 632 displaying a value of the title property 555 of the data item 534. In at least some embodiments, a user can interact with an "edit" user interface element 636 of the graphical representation 630 in order to change the image rendered in the graphical representation 630. The graphical representation 630 comprises a label 639 that indicates a last date and time at which the data item 534 was updated. The graphical representation 630 can comprise a label (not shown) indicating that no comments are associated with the data item 634. In at least some embodiments, a user can interact with such a label to display one or more user interface elements with which the user can interact to create one or more comments associated with the data item 534.

The GUI 600 can depict identifying information for one or more users that are currently viewing a graphical representation of the data document 500. For example, the label 640 depicts a user name and email address of a user viewing the graphical representation 610 via the GUI 600. In at least some scenarios, if one or more other users are viewing other graphical representations of the data document 500 via other client computing devices then similar labels, depicting their user names and/or email addresses, can be displayed as well. Thus a user can be made aware of other users that are currently viewing graphical representations of the data document 500 and that may be actively editing the document 500 via other client computing devices. In at least some scenarios, a user can interact with the user interface element 672 to invite additional users to review and/or edit graphical representations of the data document 500. For example, label 674 depicts an email address of a user that has been invited to view/edit a graphical representation of the data document 500, but that has not yet answered the invitation. Once the user accepts the invitation (for example, by clicking a link in an email sent to the user's email address), a graphical representation of the data document 500 can be displayed via a GUI of a client computing device of the user. The GUI 600 can then be updated to include a label depicting the user's user name and/or email address, thereby indicating that the user is now viewing/editing a graphical representation of the data document 500.

The graphical representations of the data items can comprise user interface elements (e.g., 638) with which a user can interact to remove associated data items from a data document. For example, a user can interact with the user interface element 638 (such as by clicking the user interface element 638 with a mouse, etc.) to remove the data item 534 from the data document 500. In at least some embodiments, a user can interact with the graphical representations of the data items to change the positions of the graphical representations within the GUI 600. For example, a user can interact with the graphical representation 620 (such as by clicking on the graphical representation 620 with a mouse and dragging the mouse) to change a position of the graphical representation 620 within the graphical representation 610.

The client computing device can be configured to detect interactions with the graphical representation 610 and to generate one or more updates to the data document 600 based on the detected interactions. For example, upon detection to a change of the text displayed in the text area 622, the client computing device can generate an update to change the value of the property 554 of the data item 532 to reflect the current text displayed in the text area 622. For example, upon detection of the creation of a comment associated with the graphical representation 620, the client computing device can generate an update to append a new comment data item representing the created comment to the comments collection 540 of the data item 532. For example, upon detection of a moving of the graphical representation 620 within the graphical representation 610, the client computing device can generate an update to change the graphical coordinate properties 556 and 558 of the data item 532 to reflect a current position of the graphical representation 620 within the graphical representation 610. For example, upon detection of a change of the image displayed in the graphical representation 630, the client computing device can generate an update to change the value of the property 557 of the data item 534 to a path to a file containing the current image. For example, upon detection of an interaction with the user interface element 638, the client computing device can generate an update to remove the data item 534 from the data document 500.

In at least some embodiments, user interface elements can be provided in the GUI 600 for adding new data items to a data document. Upon detection of the addition of a graphical representation of a data item to the graphical representation 610, the client computing device can generate an update to append a new data item to the data item collection 530.

EXAMPLE 6

Example Data Document Updates

In any of the examples described herein, a system can be provided for generating updates describing changes to one or more data documents.

FIG. 7 is a diagram depicting example data document updates 710, 720, and 730. The example data document updates 710, 720, and 730 comprise descriptions of changes (711, 721, and 731, respectively) to the example data document 500 depicted in FIG. 5. The updates 710, 720, and 730 can be generated by one or more client computing devices. The updates 710, 720, and 730 can be generated based on interactions detected via one or more graphical user interfaces (GUI's) displaying graphical representations of the example data document 500 (e.g., the GUI 600 depicted in FIG. 6).

The descriptions of changes 711, 721, and 731 are depicted in a JSON Patch format. However, other data formats are also possible. Each of the example data document updates 710, 720, and 730 comprise a document identifier 703 and a document revision identifier 705. The document identifier 703 can be used to identify a data document to which the update should be applied. For example, the value of the document identifier 703 matches the value of the document identifier property 510 of the example data document 500.

The revision identifier 705 can be used to identify a version of the data document that is targeted by the update. In at least some embodiments, the revision identifier 705 can be used as a concurrency token. Alternatively, a data document update can comprise a separate concurrency token associated with a version of the data document that is targeted by the update.

A description of a data document change (e.g., 711, 721, 731) contained within an update (e.g., 710, 720, 730) can describe one or more changes to the version of the data document targeted by the update. A description of a change can comprise an operation identifier (e.g., 713, 723, 743, 753), a path of a property within the data document that is targeted by the operation (e.g., 715, 725, 745, 755), and one or more values (e.g., 717, 727, 747, 757) to be used when performing the operation on the targeted property. Example operations include adding data to the data document, editing data in the data document, and deleting data from the data document.

A server computer can be configured to receive the update, retrieve a current version of the data document using the data document identifier 703, and use the description of the one or more changes (e.g., 711, 721, 731) to determine whether or not a concurrency check is required before applying the update to the data document. If a concurrency check is not required, a server computer can apply the update. The update can be applied by creating a new version of the data document by using the description of the one or more modifications (e.g., 711, 721, 731) to edit the current version of the data document. If a concurrency check is required, the server computer can use a concurrency token contained in the update (such as the revision identifier 705) to determine whether or not the update targets the current version of the data document. If the update targets the current version of the data document, then the server computer can apply the update to the data document. Otherwise, the server computer can reject the update.

The example update 710 comprises a change description 711 targeting the example data document 500. The change description 711 comprises the operation identifier 713, which indicates that the desired operation is an addition of data to the data document 500. The change description 711 comprises the property path 715, which identifies the comments data item collection 570 of the data item 534 in the data document 500. The value of the property path 715 comprises a collection addition symbol 716 which, in combination with the addition operation identifier 713, indicates that the value 717 should be appended to the comments data item collection 570 as a new comment data item. The value 717 comprises a definition of the new comment data item to be added to the data item collection 570. Since the new comment data item is not associated with an identifier, in scenarios where an order in which comments are recorded does not affect the consistency of the comment data item collection 570, the server computer can add the new comment data item to the comment data item collection 570 without performing a concurrency check.

The example update 720 comprises the change description 721 targeting the example data document 500. The change description 721 comprises an operation identifier 723, which indicates that the desired operation is in addition of data to the data document 500. The change description 721 comprises the property path 725, which identifies a new data item to be added to the data item collection 530 of the data document 500. The property path 725 comprises a unique identifier for the new data item. The value 727 comprises a definition of the new data item to be added to the data item collection 530 of the data document 500. A globally unique identifier (GUID) can be used as the unique identifier of the data item. In at least some scenarios, using GUID's as unique identifiers can allow multiple client computing devices to create new identifiers independently without a risk of creating redundant identifiers. Thus, in at least some cases, the server computer can determine that a data item with an identifier that is a GUID can be added to the data item collection 530 of the data document 500 without a concurrency check.

The example update 730 comprises a collection 731 of multiple change descriptions (740 and 750) targeting the example data document 500. The change description 740 comprises an operation identifier 743, which indicates that the desired operation is an editing of data in the data document 500. The change description 740 comprises the property path 745, which identifies the x-axis graphical position coordinate property 556 of the data item 532 in the data document 500. The value 747 comprises a numerical value to replace a current value of the x-axis graphical position coordinate property 556.

The change description 750 comprises an operation identifier 753, which indicates that the desired operation is an editing of data in the data document 500. The change description 750 comprises a property path 755, which identifies the y-axis graphical position coordinate property 558 of the data item 532. The value 757 comprises a numerical value to replace a current value of the y-axis graphical position coordinate property 558.

In at least some embodiments, the server computer can determine that a concurrency check is not required when applying the update 730 to the data document 500. For example, the properties 556 and 558 can make up a description of a graphical layout of the data item 532. The server computer can determine that the collection of change descriptions 731 represent a changing of graphical position coordinates for the data item 532 and can determine that the concurrency check is not required when changing a graphical position coordinate of an object. For example, in at least some scenarios, two users independently changing positions of graphical representations of a data item may not risk any data loss. Thus, in such a scenario one or more of the graphical position coordinate properties 556 and 558 can be changed without a concurrency check.

Additionally or alternatively, the server computer can comprise a list of properties of a data document that can be updated without a concurrency check. If such a list of properties indicates that an x-axis graphical position coordinate property can be updated without a concurrency check, and that a y-axis graphical position coordinate property can be updated without a concurrency check, then the server computer can conclude that the update 730 can be applied to the data document 500 without a concurrency check.

EXAMPLE 7

Example Computing Systems

Figure 8:
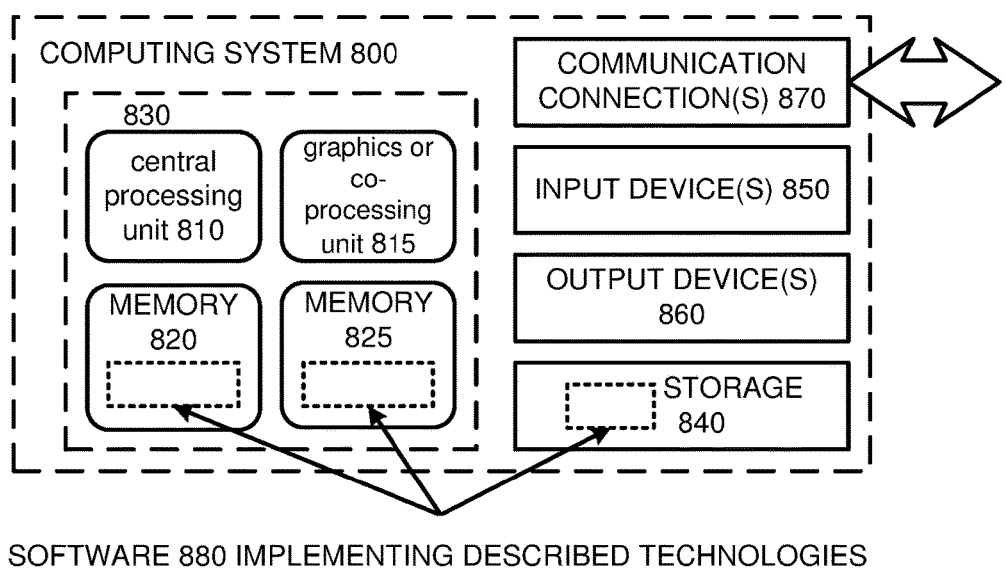
FIG. 8 is a block diagram of an example computing system in which some described embodiments can be implemented.

FIG. 8 depicts a generalized example of a suitable computing system 800 in which the described innovations may be implemented. For example, the computing system 800 can be used as a client computing device and/or server computer as described herein. The computing system 800 is not intended to suggest any limitation as to scope of use or functionality, as the innovations may be implemented in diverse general-purpose or special-purpose computing systems.

With reference to FIG. 8, the computing system 800 includes one or more processing units 810, 815 and memory 820, 825. In FIG. 8, this basic configuration 830 is included within a dashed line. The processing units 810, 815 execute computer-executable instructions. A processing unit can be a general-purpose central processing unit (CPU), processor in an application-specific integrated circuit (ASIC) or any other type of processor. In a multi-processing system, multiple processing units execute computer-executable instructions to increase processing power. For example, FIG. 8 shows a central processing unit 810 as well as a graphics processing unit or co-processing unit 815. The tangible memory 820, 825 may be volatile memory (e.g., registers, cache, RAM), non-volatile memory (e.g., ROM, EEPROM, flash memory, solid state drives, etc.), or some combination of the two, accessible by the processing unit(s). The memory 820, 825 can store software 880 implementing one or more innovations described herein, in the form of computer-executable instructions suitable for execution by the processing unit(s).

A computing system may have additional features. For example, the computing system 800 includes storage 840, one or more input devices 850, one or more output devices 860, and one or more communication connections 870. An interconnection mechanism (not shown) such as a bus, controller, or network interconnects the components of the computing system 800. Typically, operating system software (not shown) provides an operating environment for other software executing in the computing system 800, and coordinates activities of the components of the computing system 800.

The tangible storage 840 may be removable or non-removable, and includes magnetic disks, magnetic tapes or cassettes, solid state drives, CD-ROMs, DVDs, or any other medium which can be used to store information in a non-transitory way and which can be accessed within the computing system 800. The storage 840 can store instructions for the software 880 implementing one or more innovations described herein.

The input device(s) 850 may be a touch input device such as a keyboard, mouse, pen, or trackball, a voice input device, a scanning device, or another device that provides input to the computing system 800. For video encoding, the input device(s) 850 may be a camera, video card, TV tuner card, or similar device that accepts video input in analog or digital form, or a CD-ROM or CD-RW that reads video samples into the computing system 800. The output device(s) 860 may be a display, printer, speaker, CD-writer, or another device that provides output from the computing system 800.

The communication connection(s) 870 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

The innovations can be described in the general context of computer-executable instructions, such as those included in program modules, being executed in a computing system on a target real or virtual processor. Generally, program modules include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing system.

For the sake of presentation, the detailed description uses terms like "determine" and "use" to describe computer operations in a computing system. These terms are high-level abstractions for operations performed by a computer, and should not be confused with acts performed by a human being. The actual computer operations corresponding to these terms vary depending on implementation.

EXAMPLE 8

Example Cloud Computing Environment

Figure 9:
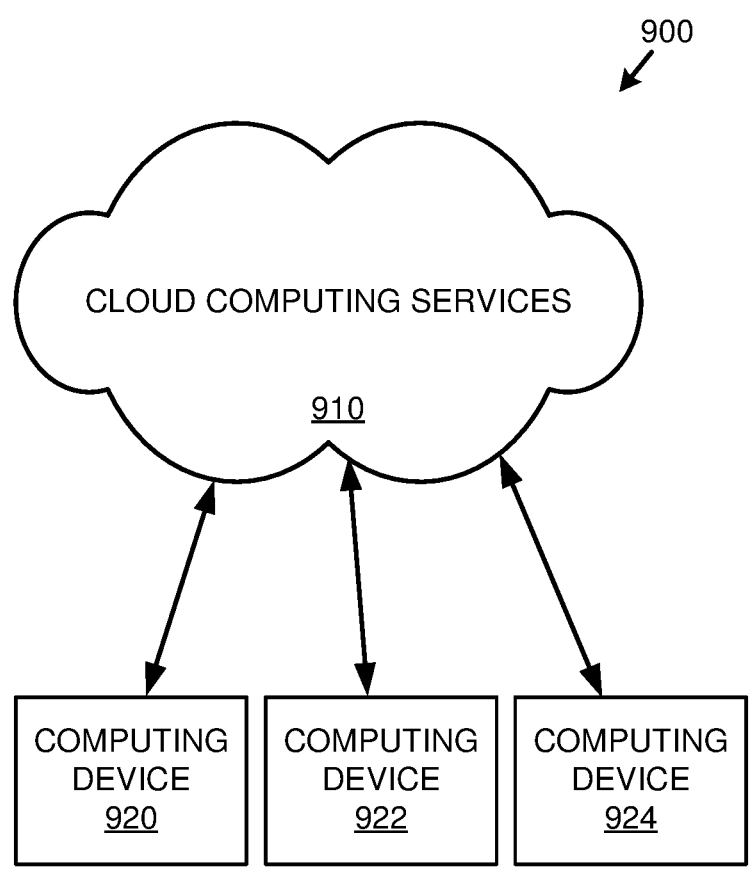
FIG. 9 is an example cloud computing environment that can be used in conjunction with the technologies described herein.

FIG. 9 depicts an example cloud computing environment 900 in which the described technologies can be implemented. The cloud computing environment 900 comprises cloud computing services 910. The cloud computing services 910 can comprise various types of cloud computing resources, such as computer servers, data storage repositories, networking resources, etc. The cloud computing services 910 can be centrally located (e.g., provided by a data center of a business or organization) or distributed (e.g., provided by various computing resources located at different locations, such as different data centers and/or located in different cities or countries).

The cloud computing services 910 are utilized by various types of computing devices (e.g., client computing devices), such as computing devices 920, 922, and 924. For example, the computing devices (e.g., 920, 922, and 924) can be computers (e.g., desktop or laptop computers), mobile devices (e.g., tablet computers or smart phones), or other types of computing devices. For example, the computing devices (e.g., 920, 922, and 924) can utilize the cloud computing services 910 to perform computing operators (e.g., data processing, data storage, and the like).

EXAMPLE 9

Example Implementations

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions or a computer program product stored on one or more computer-readable storage media and executed on a computing device (e.g., any available computing device, including smart phones or other mobile devices that include computing hardware). Computer-readable storage media can include any tangible media that can be accessed within a computing environment (e.g., one or more optical media discs such as DVD or CD, volatile memory components (such as DRAM or SRAM), or non-volatile memory components (such as flash memory, solid state drives, or magnetic media such as hard drives)). By way of example and with reference to FIG. 8, computer-readable storage media include memory 820 and 825, and storage 840. The term computer-readable storage media does not include signals and carrier waves. In addition, the term computer-readable storage media does not include communication connections (e.g., 870).

Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

The disclosed technology is not limited to any specific computer language or program. For instance, the disclosed technology can be implemented by software written in C++, Java, Perl, JavaScript, assembly language, or any other suitable programming language. Likewise, the disclosed technology is not limited to any particular computer or type of hardware.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and sub combinations with one another. The disclosed methods, apparatus, and systems are not limited to any specific aspect or feature or combination thereof, nor do the disclosed embodiments require that any one or more specific advantages be present or problems be solved.

The technologies from any example can be combined with the technologies described in any one or more of the other examples. In view of the many possible embodiments to which the principles of the disclosed technologies may be applied, it should be recognized that the illustrated embodiments are examples of the disclosed technologies and should not be taken as a limitation on the scope of the disclosed technologies. Rather, the scope of the disclosed technologies includes what is covered by the scope and spirit of the following claims.

What is claimed is:

1. A system, comprising a server computer, wherein the server computer comprises a processor and a memory, the memory storing executable instructions that, when executed by the processor, cause the server computer to perform operations, the operations comprising:
   receiving an update to a data document from a client computing device via a computer network, wherein the update comprises a concurrency token and a description of a change to the data document;
   determining, using the description of the change to the data document, that a concurrency check, comprising comparing the concurrency token in the update to a current concurrency token for the data document, can be omitted when applying the update to the data document, wherein the data document comprises a description of a graphical layout of multiple objects and wherein the determining that the concurrency check can be omitted comprises determining that the update targets a property of the description of the graphical layout that can be updated according to a last-change-wins strategy; and
   applying the update to the data document without performing the concurrency check.

2. The system of claim 1, wherein the determining that the concurrency check can be omitted comprises:
   identifying a property of the data document that is targeted by the update; and
   locating the identified property in a predefined list of concurrency-safe properties of the data document.

3. The system of claim 1, wherein the operations further comprise:
   receiving a second update to the data document from the client computing device via the computer network, wherein the second update comprises the concurrency token and a description of another change to the data document;
   determining, using description of the another change to the data document, that a concurrency check is required when applying the second update to the data document;
   performing the concurrency check, wherein performing the concurrency check comprises comparing the concurrency token in the second update to a current concurrency token stored on the server computer; and
   applying the second update to the data document only if the concurrency token in the second update matches the current concurrency token stored on the server computer.

4. The system of claim 1, wherein:
the system further comprises a database storing the data document; and
the operations further comprise:
   acquiring a database lock for the data document subsequent to receiving the update; and
   releasing the database lock for the data document subsequent to applying the update to the data document.

5. The system of claim 1, wherein the operations further comprise:
   updating a current concurrency token associated with the data document; and
   transmitting a new version of the data document, comprising the applied update and the updated concurrency token, to the client computing device via the computer network.

6. The system of claim 1, wherein:
the data document comprises data stored in a Javascript Object Notation (JSON) format; and the description of the change to the data document in the update is organized using a JSON Patch format.

7. The system of claim 1, further comprising the client computing device, wherein the client computing device is configured to:
present a graphical representation of the data document via a graphical user interface of the client computing device;
detect a change to the graphical representation of the data document made via the graphical user interface; and
generate the update to the data document based on the detected change.

8. The system of claim 7, wherein:
the data document comprises a collection of multiple data items;
the client computing device is further configured to:
present an interactive view of the data document, comprising graphical representations of the multiple data items, via the graphical user interface, and
detect a change to one of the data items; and
the description of the change to the data document in the update comprises a description of the detected change to the one of the data items.

9. The system of claim 7, wherein the client computing device is further configured to:
receive a new version of the data document from the server computer; and
present a graphical representation of the new version of the data document to a user via the graphical user interface.

10. A method, comprising:
receiving a partial update to a data document from a client computing device via a computer network, wherein the partial update comprises a description of a change to the data document and a concurrency token;
determining, based on the description of the change to the data document, whether a concurrency check, comprising comparing the concurrency token in the partial update to a current concurrency token for the data document, is required before applying the partial update to the data document, wherein the data document comprises a description of a graphical layout of multiple objects and wherein the determining whether the concurrency check is required comprises determining whether the partial update targets a property of the description of the graphical layout that can be updated according to a last-change-wins strategy;
if the concurrency check is not required, applying the partial update to the data document without performing the concurrency check; and
otherwise, performing the concurrency check, comprising determining whether the concurrency token is valid, and applying the partial update to the data document only if the concurrency token is valid.

11. The method of claim 10, wherein:
the determining whether the concurrency check is required further comprises:
determining that the description of the change comprises a changing of a graphical position coordinate of one of the multiple objects.

12. The method of claim 10, wherein applying the partial update to the data document without checking the concurrency token comprises:

reading a current version of the data document from a database;
using the description of the change and the current version of the data document to create a new version of the data document; and
writing the new version of the data document to the database.

13. The method of claim 12, wherein applying the partial update to the data document without checking the concurrency token further comprises:
creating a new concurrency token; and
associating the new concurrency token with the new version of the data document.

14. The method of claim 13, wherein the method further comprises transmitting the new version of the data document and the new concurrency token to the client computing device.

15. The method of claim 10, wherein:
the data document comprises data stored in a Javascript Object Notation (JSON) format; and
the description of the change to the data document in the partial update comprises data organized using a JSON Patch format.

16. The method of claim 10, wherein
the description of the change to the data document comprises a change to a graphical layout of one of the multiple objects in a graphical user interface of the client computing device.

17. The method of claim 10, wherein:
the concurrency token comprises a numerical value; and
the method further comprises incrementing the numerical value of the concurrency token.

18. One or more computer-readable media storing instructions that, when executed by one or more processors, cause the one or more processors to perform operations, the operations comprising:
transmitting a data document to a client computing device via a computer network, wherein the data document comprises a concurrency token;
receiving a partial update to the data document from the client computing device, wherein the partial update comprises a description of a change to a portion of the data document and the concurrency token;
determining, using the description of the change to the portion of the data document, whether a concurrency check, comprising comparing the concurrency token in the partial update with a current concurrency token associated with the data document, is required before applying the partial update to the data document, wherein the data document comprises a description of a graphical layout of multiple objects and wherein the determining whether the concurrency check is required comprises determining whether the partial update targets a property of the description of the graphical layout that can be updated according to a last-change-wins strategy;
if the concurrency check is not required, applying the partial update to the data document without performing the concurrency check; and
otherwise, performing the concurrency check and applying the partial update to the document if the concurrency token in the partial update matches the current concurrency token associated with the document.

* * * * *